United States Patent [19]

Sekimoto

[11] 4,440,473

[45] Apr. 3, 1984

[54] VOLTAGE POLARITY SWITCHING MEANS FOR CHOLESTERIC LIQUID CRYSTAL DISPLAYS

[75] Inventor: Souichi Sekimoto, Kanagawa, Japan

[73] Assignee: Fuji Xerox Co., Ltd., Tokyo, Japan

[21] Appl. No.: 270,723

[22] Filed: Jun. 5, 1981

[30] Foreign Application Priority Data

Oct. 31, 1980 [JP] Japan .................. 55-152277

[51] Int. Cl.³ .............. G02F 1/137; G02F 1/135; G02F 1/133
[52] U.S. Cl. .................. 350/342; 350/332; 350/346
[58] Field of Search ............ 350/342, 346, 332

[56] References Cited

U.S. PATENT DOCUMENTS

| 3,592,527 | 11/1969 | Conners | 350/342 |
| 3,705,059 | 12/1972 | Kun | 136/265 X |
| 3,758,207 | 9/1973 | Letzer | 350/342 X |
| 4,156,558 | 5/1979 | Grumet | 350/342 X |

FOREIGN PATENT DOCUMENTS 2227547 4/1973 France .................. 350/342

OTHER PUBLICATIONS

Haas et al., "Simple Real Time Light Valves", *Appl. Phys Lett.*, vol. 29, No. 6, American Institute of Physics, Sep. 15, 1976.

*Primary Examiner*—John K. Corbin
*Assistant Examiner*—David Lewis
*Attorney, Agent, or Firm*—Sughrue, Mion, Zinn, Macpeak & Seas

[57] ABSTRACT

A display device particularly adapted for use with a microfilm reader, in which an illuminating light source need be activated only in an initial reading stage. A first transparent electrode, a liquid crystal layer, a semiconductor layer and a second transparent electrode are stacked together in the stated order. A voltage is applied between the first and second transparent electrodes which is switched in a polarity between an initial reading mode and a display mode.

9 Claims, 4 Drawing Figures

4,440,473

VOLTAGE POLARITY SWITCHING MEANS FOR CHOLESTERIC LIQUID CRYSTAL DISPLAYS

BACKGROUND OF THE INVENTION

The present invention relates to display devices. More particularly, the invention relates to a display device in which a stored visible image is formed on a display element by an optical signal.

One of the most popularly employed display devices is a film reader. The film reader has a screen in an optical image forming section, and an enlarged image is produced by the utilization of the variations in intensity of light diffused and passed through the screen. The conventional film reader is disadvantageous in that when the ambient light is high in brightness, or when the screen is observed at other than a direct angle, the contrast of the viewed image is low making it difficult to read the image on the screen.

Furthermore, although an enlarged image on the film reader has as a whole, a lower contrast than an ordinary document, it is nevertheless necessary for the film reader to project characters on an enlarged scale. In addition, since it is necessary to maintain the light source in the ON state the entire time the image is being read, the quantity of heat generated thereby is large. Accordingly, it is necessary to use heat resistant components in the construction of the reader and to provide some way to radiate heat. Moreover, the power consumption is large. Thus, the conventional film reader is not economical.

In order to eliminate the above-described drawbacks, a display device using a material such as liquid crystals having an electro-optical effect and a photosensitive material in combination has been proposed in the art.

Such a display device can be implemented as a liquid crystal panel formed by laminating with an insulating layer (or a dielectric mirror) a photosensitive material which has a spectral sensitivity corresponding to the wavelentgh of an image writing light source but not a spectral sensitivity corresponding to the wavelength of an image reading light source, and a liquid crystal.

However, the liquid crystal panel is disadvantageous in that the manufacturing cost thereof is high and the manufacturing yield is low because the manufacture of the liquid crystal panel requires a large number of manufacturing steps and a variety of materials which are difficult to handle. Also, the arrangement and operation of the driving circuit thereof are rather intricate.

SUMMARY OF THE INVENTION

Accordingly, an object of the invention is to provide a display device in which the above-described difficulties are eliminated by improving the structure of the conventional display device, in which the ambient light, which is one of the factors causing the drawbacks of the conventional display device, is positively utilized, and an enlarged image having a high contrast and excellent picture quality is obtained on the screen.

Another object of the invention is to provide a display device having a high reliability and low power consumption, in which, even if the light source is turned off, the enlarged image is not erased from the screen.

A further object of the invention is to provide a display device in which only a photosensitive material having one kind of spectral sensitivity is used, and on which an image can be written and erased using a simple drive circuit.

In order to achieve the foregoing objects of the invention, according to the invention a material exhibiting an electro-optical effect and a photosensitive material are used in combination for the screen. The material having the electro-optical effect may have additionally a memory characteristic. Typical examples of the material having the electro-optical effect and the memory characteristic are PLZT and liquid crystals (especially a liquid crystal mixture obtained by adding several to several tens of percents of cholesteric liquid crystal to a nematic liquid crystal). Examples of the photosensitive material are p-type (or n-type) Se, Se-Te-As, SbS, AsS, Se-As, Se-Sb, ZnSe, CdSe and CdS.

DESCRIPTION OF THE PREFERRED EMBODIMENTS

Figure 1:
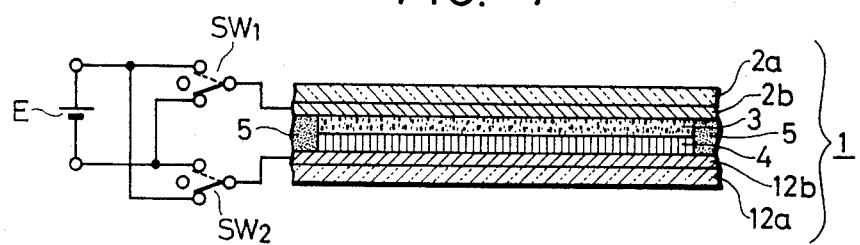
FIG. 1 is a sectional view of a preferred embodiment of a display device of the invention.

A preferred embodiment of the invention will be described with reference to the accompanying drawings. FIG. 1 is a sectional view of a display device of the invention. In FIG. 1, reference character 1 designates a display element, 2a and 12a first and second transparent substrates such as glass plates, 2b and 12b first and second transparent electrodes such as $SnO_2$ films, 3 a liquid crystal layer having an electro-optical effect and a memory characteristic, 4 a p-type photo-semiconductor (photoconductor) layer, and 5 a spacer.

As is apparent from FIG. 1, the display element 1 is constructed by stacking the transparent substrate 2a, the first transparent electrode 2b, the liquid crystal layer 3, the p-type photo-semiconductor layer 4, the second transparent electrode 12b, and the second transparent substrate 12a one on another in the stated order.

Figure 3:
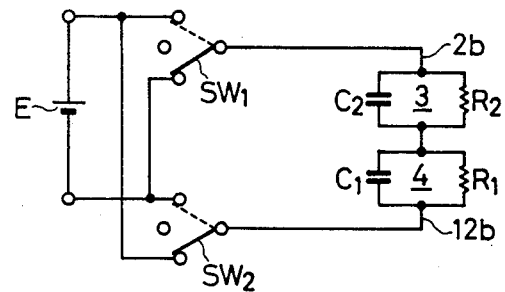
FIG. 3 is an equivalent circuit diagram of a display element shown in FIG. 1.

The operation of the display device according to the invention will be described with reference to FIGS. 1 and 3 in detail. FIG. 3 is an equivalent circuit diagram of the device shown in FIG. 1. In FIG. 3, reference characters $C_1$ and $R_1$ designates the capacitance and resistance of the photo-semiconcuctor layer 4, respectively, and reference characters $C_2$ and $R_2$ designate the capacitance and resistance of the liquid crystal layer 3, respectively.

To write an image on the display element 1, the armatures of change-over switches SW1 and SW2 are set as indicated by the solid lines so that a positive voltage and a negative voltage are applied to the transparent electrode 12b on the side of the photo-semiconductor layer 4 and the transparent electrode 2b on the side of the liquid crystal layer 3 by a power source E, respectively. At the same time, an image light beam is applied to the display element from the side of the transparent electrode 12b while ambient light of lower intensity than the image light beam is applied to the entire display element from the side of the transparent electrode 2b.

Upon application of the image light beam, carriers are generated in the photo-semiconductor layer 4. Therefore, in a portion of the photo-semiconductor layer 4 corresponding to the light part of the image light beam, current can flow readily. That is, the resistance of that portion of the photo-semiconductor layer 4 is decreased so that a voltage drop occurs therein. As a result, the voltage applied to the liquid crystal layer 3 is increased.

The liquid crystal layer 3 is preferably formed of a cholesteric-nematic phase transition type liquid crystal material. With this material, as indicated by the curve A in FIG. 2, the voltage-transmissivity characteristic of the liquid crystal layer 3 is such that the optical transmissivity thereof is large when the applied voltage is $E_1$ or lower but decreases when the applied voltage is higher than $E_1$ but lower than $E_2$. The optical transmissivity increases again when the applied voltage increases to higher than $E_2$.

Accordingly, when the image light beam is applied to the display element from the side of the photo-semiconductor layer 4, the applied voltage E(h) is high in portions of the liquid crystal layer 3 corresponding to the light part of the image light beam while the applied voltage E(d) is low in portions of the liquid crystal layer 3 corresponding to the dark part of the image light beam.

Therefore, if the supply voltage E is so selected that in corresponding to the light and dark parts of the image light beam the voltage E(h) is higher than $E_2$ and the voltage E(d) is in the range of from $E_1$ to $E_2$, the portion of the liquid crystal layer 3 corresponding to the light part of the image light beam is optically transmissive. Accordingly, when the display element is observed from the side of the liquid crystal layer 3, the surface of the photo-semiconductor layer 4 can be observed.

In general, the surface of the photo-semiconductor layer 4 can be made black and that portion employed as the dark part of a written image. On the other hand, a portion of the liquid crystal layer 3 corresponding to the dark part of the image light beam has an optical scattering characteristic. Therefore, when such a portion is observed from the side of the liquid crystal layer 3, the reflected and scattered ambient light beams are observed. Accordingly, that portion can be employed as the light part of the written image. Thus, a negative image is formed in the liquid crystal by the image light beam.

Figure 2:
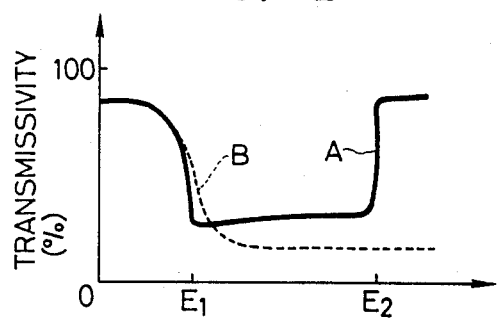
FIG. 2 is a graphical representation showing voltage-transmissivity characteristic curves of liquid crystals employed in the invention.

It can be readily understood from FIG. 2 that if the supply voltage E is so selected that the voltage E(h) is in the range of from $E_1$ to $E_2$ and the voltage E(d) is lower then $E_1$, a positive image will be formed in the liquid crystal layer 3 by the image light beam.

If the voltages are selected as described above, a liquid crystal having a voltage-transmissivity characteristic as indicated by the curve B in FIG. 2 may be employed.

In writing an image, it is necessary to overlap the voltage application timing and the image light beam projection timing for a sufficient period of time, for instance 0.5 second or longer. In this connection, the image writing operation is scarcely affected by the ambient light beam because the variation of the conductivity of the photo-semiconductor layer 4 due to the ambient light beam from the side of the liquid crystal layer 3 is very small.

In order to store and hold an image which has been written as described above, the armatures of the change-over switches SW1 and SW2 are moved to their middle positions to suspend the voltage application to the display element 1 momentarily, for example, 1 msec or shorter.

In order to to erase an image which has been stored on the display element 1, the armatures of the change-over switches SW1 and SW2 are moved to the positions indicated by the dotted lines in FIG. 3. In this case, the positive voltage is applied to the side of the liquid crystal layer 3 while the negative voltage is applied to the side of the photo-semiconductor layer 4.

In this operation, ambient light is applied to the entire surface of the photo-semiconductor layer 4 through the liquid crystal layer 3 from the side of the transparent electrode 2 as a result of which carriers are provided in the photo-semiconductor layer 4. Accordingly, the conductivity of the photo-semiconductor layer 4 is decreased and the voltage applied to the liquid crystal layer 3 is increased. Therefore, as is apparent from FIG. 2, a voltage of $E_2$ or higher or a voltage between $E_1$ and $E_2$ is applied to the liquid crystal layer. Accordingly, the transmissivity of the liquid crystal layer 3 becomes substantially 100% over the entire surface thereof so that the recorded image is erased.

Figure 4:
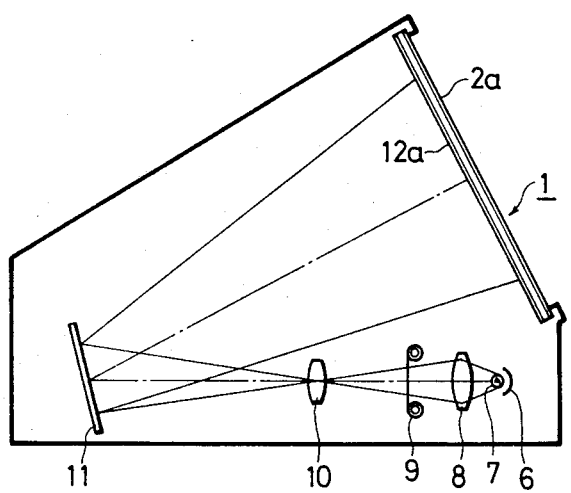
FIG. 4 is a schematic diagram showing an application of the invention to a microfilm reader.

FIG. 4 is a schematic diagram showing an example where the display element in FIG. 1 is applied to a microfilm reader. In FIGS. 4 and 1, like parts are designated by like reference numerals or characters. However, for simplification of the drawing, the display element driving electric power circuit is not shown in FIG. 4.

In FIG. 4, reference numeral 6 designates a reflector, 7 a projecting light source, 8 a condenser lens disposed in front of the light source 7 for condensing light from the light source 7, 9 microfilm, 10 a projecting lens disposed near the position where the light passing through the microfilm from the light source 7 is focused, and 11 a mirror for reflecting an image from the microfilm 9.

Light from the light source 7 and the reflecting mirror 6, condensed by the condenser lens 8, illuminates the picture region of the microfilm 9. The image of the picture region thus illuminated is formed on an enlarged scale on the liquid crystal display element 1 by the projecting lens 10 and the mirror 11.

In this operation, the change-over switches SW1 and SW2 in FIG. 3 are positioned as indicated by the solid lines. Therefore, the liquid crystal layer 3 is not affected by light from the side of the transparent substrate 2a and only light from the transparent substrate 12a, corresponding to the enlarged image light beam of the microfilm, is employed to write the image in the liquid crystal layer 3.

Thus, as is apparent from the above description, a two-dimensional pattern composed of optical scattering portions and optical non-scattering portions is formed in the display element 1 in correspondence with the light and dark parts of the enlarged image light beam. The image thus formed is maintained even if the light source 7 and the power source are turned off.

A stored image can be erased merely by moving the armatures of the switches SW1 and SW2 to the positions indicated by dotted lines as was described above.

In accordance with the invention, by suitably combining the positive and negative bias voltages applied to the display element and the directions of light illumination, the voltage applied to the liquid crystal layer 3 can be varied to control the optical characteristic thereof. The light source may be an electron beam or a laser if desired.

In the above-described embodiment of the invention, a liquid crystal layer is employed. However, it should be noted that the invention is not limited thereto or thereby and the liquid crystal layer may be replaced by any material having an electro-optical effect and a memory effect.

In addition, any p-type photo-semiconductor material may be employed if it is sensitive to the wavelength of the light source and to visible light. In general, in view of convenience of manufacture of the display element, compounds of As or Sb, which have excellent heat resistance and resistance to chemical change, are preferably employed.

Furthermore, an n-type photo-conductor may be employed. In this case, it is required that the voltage polarity be opposite to that in the case of a p-type photo-conductor. Alloys of ZnSe, CdS and ZnO can be employed as the n-type photoconductor.

To summarize, the invention provides the following advantageous effects:

(1) The structure of the photo-sensitive film (photo-semiconductor) is simple.

(2) An image can be written and erased merely by switching the polarity of the biasing electric source.

(3) Only when an image is being written is the light source turned on and the power source used to apply the biasing voltage. Therefore, the power consumption is small, and heat generation is also small.

(4) As photosensitive film greatly absorbs light, the quantity of light reflected or scattered by the surface of the film is very small. Therefore, an image provided by the combination of the transparent portions and the optical scattering portions of a material such as a liquid crystal having the electro-optical effect provides a high contrast and it can be more easily read as the ambient light is increased in intensity.

(5) The image can be observed with reflected light only. The readability of the display device of the invention is less dependent on the viewing angle than prior art devices. With the invention, even small characters can be easily read.

What is claimed is:

1. A display device comprising: a first transparent electrode; a film layer having an electro-optical effect comprising a layer of nematic liquid crystal material containing several to several tens of percent of cholesteric liquid crystal material; a photosensitive film layer and a second transparent electrode, said first transparent electrode, said film layer having an electro-optical effect said photosensitive film layer and said second transparent electrode being stacked together in the stated order; means for providing a d.c. voltage across said first and second transparent electrodes; and means for switching the polarity of said d.c. voltage applied across said first and second transparent electrodes.

2. A display device comprising: a first transparent electrode; a film layer having an electro-optical effect comprising a layer of nematic liquid crystal material containing several to several tens of percent of cholesteric liquid crystal material; a photosensitive film layer and a second transparent electrode, said first transparent electrode, said film layer having an electro-optical effect said photosensitive film layer and said second transparent electrode being stacked together in the stated order; means for providing a d.c. voltage across said first and second transparent electrodes; means for switching the polarity of said d.c. voltage applied across said first and second transparent electrodes; a light source; a microfilm; a reflector for directing light from said light source toward said microfilm; a condenser lens disposed between said light source and said microfilm; a projecting lens receiving light passing through microfilm; and a mirror for refracting light passing through said projecting lens onto said photosensitive film layer.

3. The display device of claim 1 or 2 wherein said photosensitive film layer comprises an erasable photosensitive film layer.

4. The display device of claim 1 or 2 wherein said photosensitive material comprises a semiconductor material.

5. The display device of claim 4 wherein said semiconductor material comprises a material selected from the group consisting of Se, Se-Te-As, SbS, AsS, Se-As, Se-Sb, ZnSe, CdSe and CdS.

6. The display device of any of claims 1, 3, 4 or 5 further comprising a spacer layer disposed between said film layer having an electro-optical effect and said photosensitive film layer.

7. The display device of any of claims 1, 3, 4 or 5 further comprising first and second substrates sandwiching said first transparent electrode, said film layer having an electro-optical effect, said photosensitive film layer and said second transparent electrode.

8. The display device of any of claims 1, 3, 4 or 5 wherein said photosensitive film layer has a black coating on the side thereof adjacent said film layer having an electro-optical effect.

9. The display device of any of claims 1, 3, 4 or 5 further comprising utilizing means in a microfilm reader.

* * * * *